US012803155B2

(12) United States Patent
Kim et al.

(10) Patent No.: US 12,803,155 B2
(45) Date of Patent: Nov. 17, 2026

(54) ANTENNA ASSEMBLY FOR A WIRELESS EAR COMPUTER

(71) Applicants: Tyco Electronics AMP Korea Co., Ltd., Gyeongsan (KR); TE Connectivity Solutions GmbH, Schaffhausen (CH)

(72) Inventors: Jung Hyun Kim, Yeongtong-gu (KR); Dong Wook Park, Yeongtong-gu (KR); Xing Yun, Oxford, MI (US)

(73) Assignees: TE Connectivity Solutions GmbH, Schaffhausen (CH); Tyco Electronics AMP Korea Co., Ltd., Gyeongsan-si (KR)

( * ) Notice: Subject to any disclaimer, the term of this patent is extended or adjusted under 35 U.S.C. 154(b) by 393 days.

(21) Appl. No.: 18/480,872

(22) Filed: Oct. 4, 2023

(65) Prior Publication Data

US 2024/0204390 A1 Jun. 20, 2024

Related U.S. Application Data

(60) Provisional application No. 63/433,393, filed on Dec. 16, 2022.

(51) Int. Cl.

| | |
|---|---|
| ***H01Q 1/27*** | (2006.01) |
| ***H01Q 1/36*** | (2006.01) |
| ***H01Q 1/48*** | (2006.01) |
| ***H01Q 1/50*** | (2006.01) |

(52) U.S. Cl.

CPC ............... *H01Q 1/273* (2013.01); *H01Q 1/36* (2013.01); *H01Q 1/48* (2013.01); *H01Q 1/50* (2013.01)

(58) Field of Classification Search

CPC ............ H01Q 1/273; H01Q 1/36; H01Q 1/48; H01Q 1/50

See application file for complete search history.

(56) References Cited

U.S. PATENT DOCUMENTS

| | | | | |
|---|---|---|---|---|
| 10,321,593 | B1 * | 6/2019 | Lettow | H05K 5/15 |
| 10,972,824 | B1 | 4/2021 | Tseng | |
| 11,355,834 | B2 * | 6/2022 | Elghannai | H05K 1/0306 |
| 2015/0036854 | A1 * | 2/2015 | Polinske | H01Q 1/273 381/315 |

(Continued)

FOREIGN PATENT DOCUMENTS

WO 2022165033 A1 8/2022

OTHER PUBLICATIONS

Extended European Search Report for corresponding EP Application No. 23216386.5-1201 dated Apr. 22, 2024 (9 pages).

*Primary Examiner* — David Bilodeau

(57) ABSTRACT

A wireless ear computer includes a flexible circuit in a cavity of a casing. The flexible circuit surrounds a component pocket receiving electrical components. The flexible circuit has a power circuit, a speaker circuit, and a ground plane. A battery, in the component pocket, is operably coupled to the battery circuit to power the electrical components. A speaker is operably coupled to the speaker circuit and connected to the ground plane. The wireless ear computer includes an antenna having an antenna element extending along the casing and being spaced apart from, and located outward of, the flexible circuit. The antenna includes an antenna feed and an antenna ground connected to the ground plane of the flexible circuit.

19 Claims, 11 Drawing Sheets

(56) References Cited

U.S. PATENT DOCUMENTS

| | | | | |
|---|---|---|---|---|
| 2015/0116159 | A1* | 4/2015 | Chen | H01Q 5/22 343/702 |
| 2016/0050474 | A1* | 2/2016 | Rye | H05K 7/1427 381/152 |
| 2019/0103661 | A1* | 4/2019 | Cousins | H01Q 1/273 |
| 2019/0260111 | A1* | 8/2019 | Muthuswamy | H04R 1/1025 |
| 2020/0021905 | A1 | 1/2020 | Briggs et al. | |
| 2020/0044323 | A1* | 2/2020 | Oesch | H01Q 7/00 |
| 2020/0335855 | A1* | 10/2020 | Chen | H01Q 1/48 |
| 2021/0306773 | A1* | 9/2021 | Kvist | H01Q 1/48 |
| 2022/0021989 | A1 | 1/2022 | Shriner et al. | |
| 2022/0159363 | A1 | 5/2022 | Yang et al. | |
| 2022/0278441 | A1* | 9/2022 | Kodama | H01Q 9/26 |
| 2022/0278442 | A1 | 9/2022 | Kogama et al. | |
| 2022/0417636 | A1* | 12/2022 | Zhang | H01Q 1/273 |
| 2024/0021976 | A1* | 1/2024 | Yang | H01Q 1/273 |

* cited by examiner

ANTENNA ASSEMBLY FOR A WIRELESS EAR COMPUTER

CROSS REFERENCE TO RELATED APPLICATIONS

This application claims benefit to U.S. Provisional Application No. 63/433,393, filed 16 Dec. 2022, titled "ANTENNA ASSEMBLY FOR A WIRELESS EAR COMPUTER", the subject matter of which is herein incorporated by reference in its entirety.

BACKGROUND OF THE INVENTION

The subject matter herein relates generally to wireless ear computers.

There is an increasing trend for wearable devices, such as wireless headphones, which can be linked to the portable device, such as a smart phone. However, some wearable devices, such as wireless headphones, have a small form factor. Design of the antenna structures for feeding the wireless connection between the wearable device and the portable device can be problematic. For example, the wearable device typically includes many electrical components, such as a battery, a microphone, a speaker, a touch of motion sensors, a circuit board assembly, and other components densely integrated into the housing of the wearable device. The dense integration of the electrically conductive components into the compact space allows the limited space for an antenna to radiate effectively.

BRIEF DESCRIPTION OF THE INVENTION

In one embodiment, a wireless ear computer is provided and includes a casing forming a cavity. The wireless ear computer includes a flexible circuit received in the cavity. The flexible circuit surrounds a component pocket configured to receive at least one electrical component. The flexible circuit has a power circuit and a speaker circuit. The flexible circuit includes a ground plane. The wireless ear computer includes a battery received in the component pocket. The battery is operably coupled to the battery circuit to power the at least one electrical component. The battery is connected to the ground plane of the flexible circuit. The wireless ear computer includes a speaker operably coupled to the speaker circuit to control the speaker. The speaker is connected to the ground plane of the flexible circuit. The wireless ear computer includes an antenna having an antenna element extending along the casing. The antenna element is spaced apart from, and located outward of, the flexible circuit. The antenna includes an antenna feed and an antenna ground. The antenna ground is connected to the ground plane of the flexible circuit.

In another embodiment, a wireless ear computer is provided and includes a casing forming a cavity. The casing includes an interior surface and an exterior surface. The wireless ear computer includes a flexible circuit received in the cavity. The flexible circuit surrounds a component pocket configured to receive at least one electrical component. The flexible circuit has a power circuit and a speaker circuit. The flexible circuit includes a ground plane. The wireless ear computer includes a battery received in the component pocket. The battery is operably coupled to the battery circuit to power the at least one electrical component. The battery is connected to the ground plane of the flexible circuit. The wireless ear computer includes a speaker operably coupled to the speaker circuit to control the speaker. The speaker is connected to the ground plane of the flexible circuit. The wireless ear computer includes an antenna extending along the casing. The antenna element is spaced apart from, and located outward of, the flexible circuit. The antenna includes an inner portion extending along the interior surface of the casing. The antenna includes an outer portion extending along the exterior surface of the casing. The antenna includes a connecting portion between the inner portion and the outer portion. The inner portion of the antenna includes an antenna feed connected to a transmission line. The inner portion of the antenna includes an antenna ground connected to the ground plane of the flexible circuit.

In a further embodiment, a wireless ear computer is provided and includes a casing forming a cavity. The casing includes an interior surface and an exterior surface. The wireless ear computer includes a flexible circuit received in the cavity. The flexible circuit surrounds a component pocket configured to receive at least one electrical component. The flexible circuit has a power circuit and a speaker circuit. The flexible circuit includes a transceiver. The flexible circuit includes a ground plane. The wireless ear computer includes a battery received in the component pocket. The battery is operably coupled to the battery circuit to power the at least one electrical component. The battery is connected to the ground plane of the flexible circuit. The wireless ear computer includes a speaker operably coupled to the speaker circuit to control the speaker. The speaker is connected to the ground plane of the flexible circuit. The wireless ear computer includes an RF front-end module coupled to the flexible circuit. The RF front-end module is operably coupled to the transceiver. The wireless ear computer includes an antenna having an antenna element extending along the casing. The antenna element is spaced apart from, and located outward of, the flexible circuit. The antenna includes an antenna feed and an antenna ground. The antenna feed is connected to the RF front-end module. The antenna ground is connected to the ground plane of the flexible circuit.

DETAILED DESCRIPTION OF THE INVENTION

Figure 1:
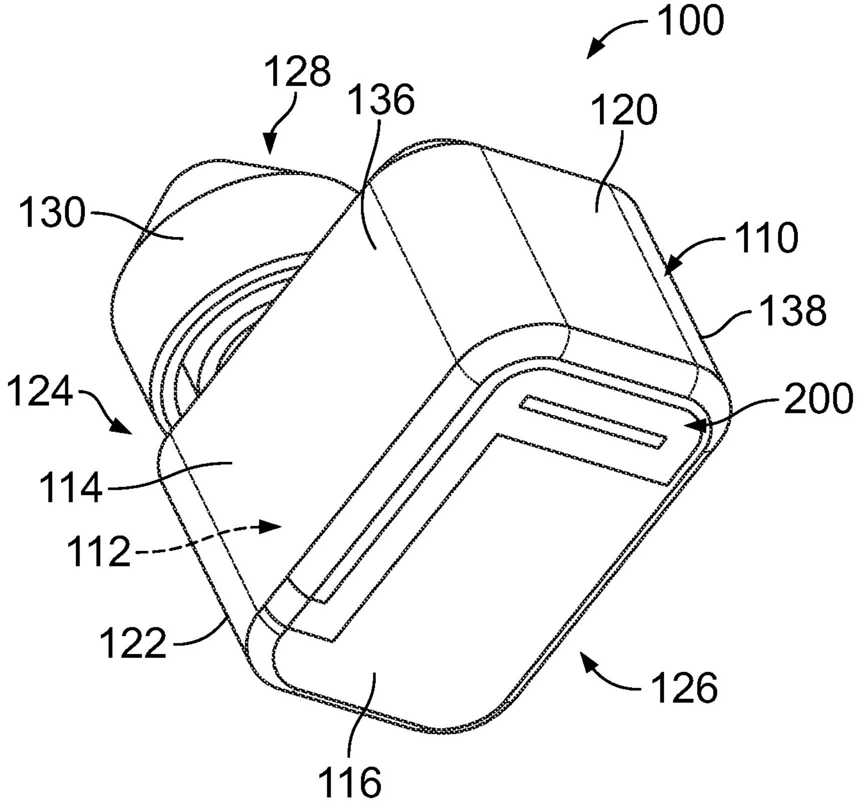
FIG. 1 is a front perspective view of the wireless ear computer in accordance with an exemplary embodiment.
Figure 2:
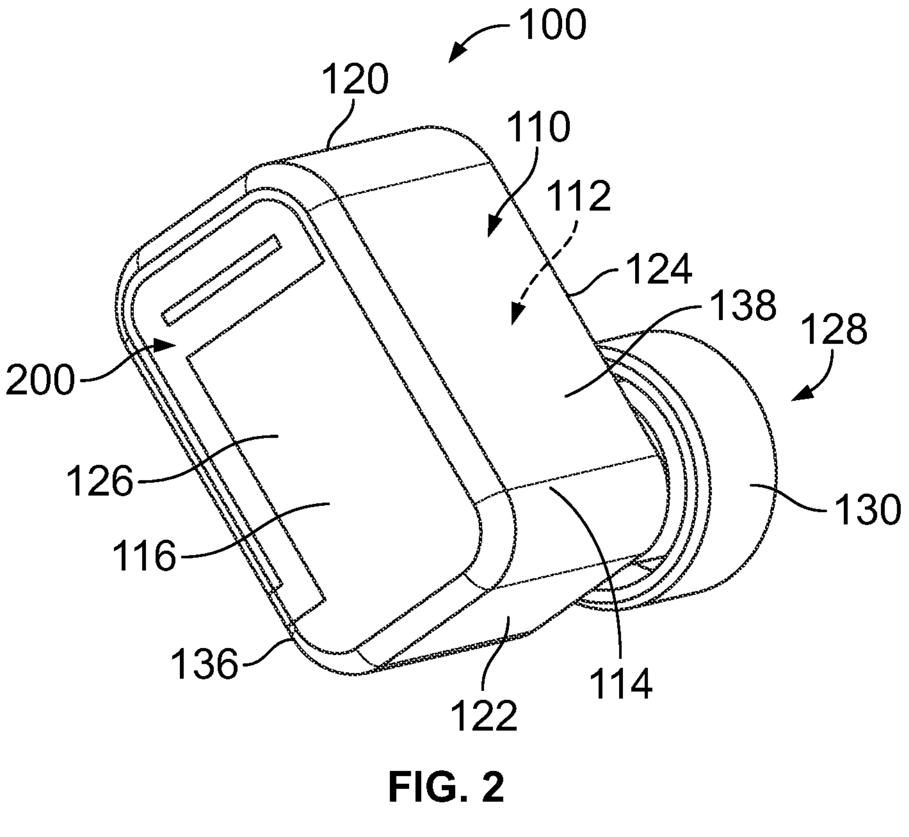
FIG. 2 is a rear perspective view of the wireless ear computer in accordance with an exemplary embodiment.

FIG. 1 is a front perspective view of the wireless ear computer 100 in accordance with an exemplary embodiment. FIG. 2 is a rear perspective view of the wireless ear computer 100 in accordance with an exemplary embodiment. The wireless ear computer 100 is a wearable device configured be worn in the ear of a user. For example, the wireless ear computer 100 is a wireless earphone in various embodiments. The wireless ear computer 100 includes an antenna 200 providing wireless communication, such as with a portable device, such as a smart phone or other handheld device. The antenna 200 provides stable wireless connection with the portable device. The antenna design takes into consideration the complex device structure of the wireless ear computer 100, the small size constraints of the wireless ear computer 100, and the close human ear condition of the wireless ear computer 100 to provide good antenna performance for wireless connection with the portable device.

The wireless ear computer 100 includes a casing 110 forming a cavity 112 holding the internal electronics of the wireless ear computer 100. In an exemplary embodiment, the casing 110 includes a main body 114 forming the cavity 112 and at least one cover 116 to close the cavity 112. The antenna 200 may be provided on the main body 114 and/or the cover 116. The casing 110 extends between a top 120 and a bottom 122. The casing 110 extends between an inner end 124 and an outer end 126. The cover 116 may be provided at the outer end 126. A plug portion 128 is provided at the inner end 124 and is configured to be plugged into the ear of the user. Rubber tips may be provided on the plug portion 128 to plug into the ear of the user. The casing 110 extends between a front 136 and a rear 138. The casing 110 may be a multi-piece casing, such as a clamshell type casing. The pieces may be secured together using fasteners. Other types of securing features may be used in alternative embodiments, such as clips, latches, adhesive, or other securing features.

While the casing 110 is shown as generally box shaped having the plug portion 128 extending therefrom, such as at a downward and inward angle, it is realized that the casing 110 may have other shapes in alternative embodiments. For example, the casing 110 may be contoured to fit within the user's ear. The internal electronic components of the wireless ear computer 100 are designed to fit within the cavity 112 of the casing 110 and extend into the plug portion 128 to deliver sound to the user's ear. The antenna 200 is integrated with the internal electronics of the wireless ear computer 100 and is patterned and positioned to provide robust performance. In the illustrated embodiment, the antenna 200 extends along the outer end 126 of the casing 110, such as to locate the antenna 200 furthest from the user's ear. The shape of the pattern of the antenna 200 is located based on the positioning of the internal electronics to provide robust performance.

Figure 3:
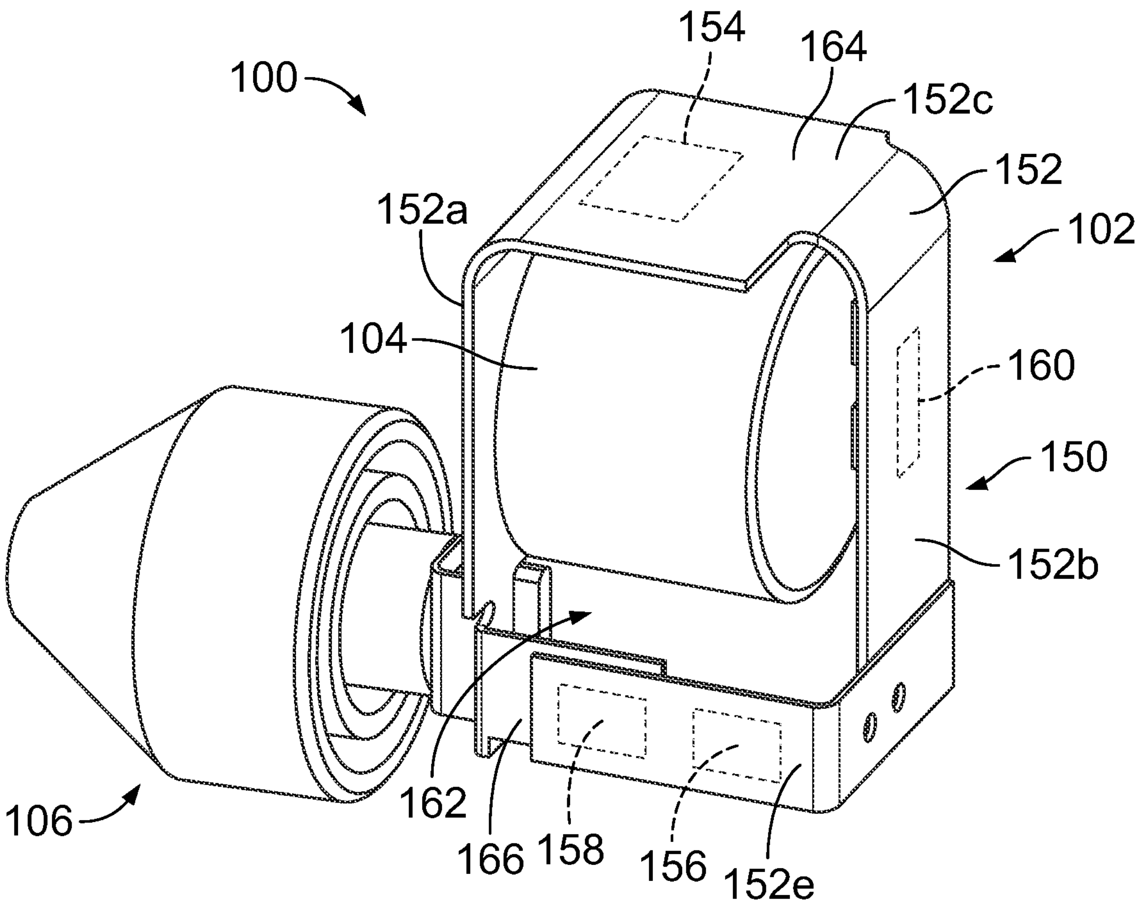
FIG. 3 is a perspective view of the internal electronic components of the wireless ear computer in accordance with an exemplary embodiment.
Figure 4:
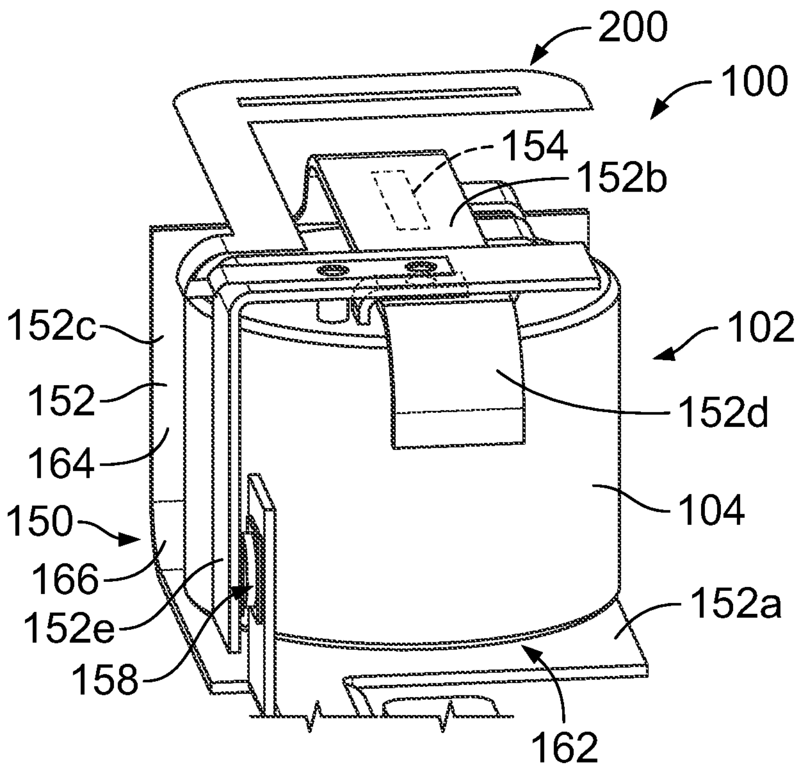
FIG. 4 is an end view of the internal electronic components of the wireless ear computer in accordance with an exemplary embodiment.
Figure 5:
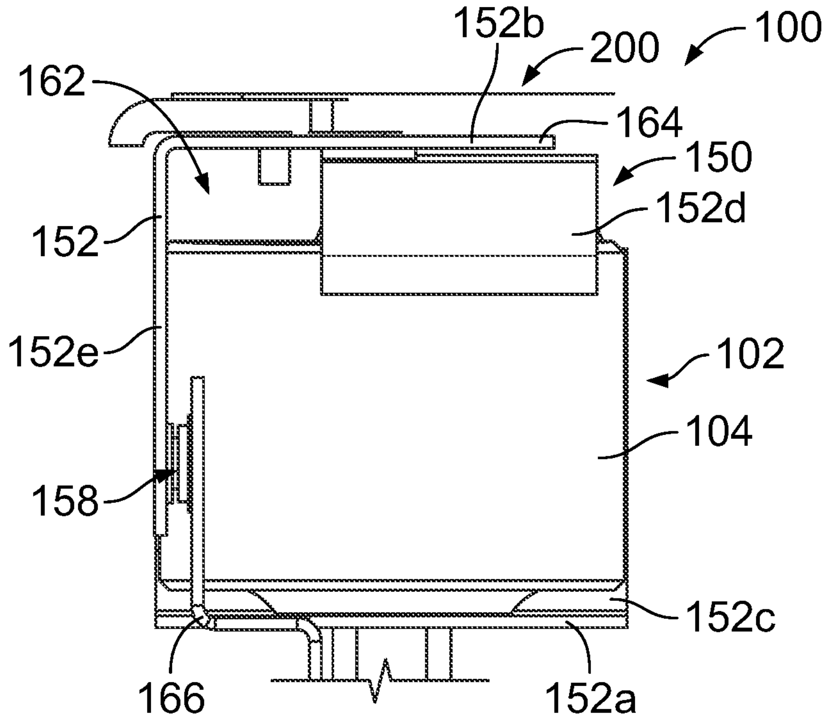
FIG. 5 is a side view of the internal electronic components of the wireless ear computer in accordance with an exemplary embodiment.

FIG. 3 is a perspective view of the internal electronic components 102 of the wireless ear computer 100 in accordance with an exemplary embodiment. FIG. 4 is an end view of the internal electronic components 102 of the wireless ear computer 100 in accordance with an exemplary embodiment. FIG. 5 is a side view of the internal electronic components 102 of the wireless ear computer 100 in accordance with an exemplary embodiment. The casing 110 (FIGS. 1-2) is removed to illustrate the internal electronic components 102. The internal electronic components 102 are configured to be tightly packaged within the casing 110.

In an exemplary embodiment, the internal electronic components 102 include a battery 104 and a speaker 106. Other types of internal electronic components 102 may additionally be included, such as a microphone, sensors (for example, touch sensors, motion sensors, and the like), indicators, or other types of electronic components.

In an exemplary embodiment, the wireless ear computer 100 includes a control module 150 for controlling operation of the electronic components 102. The control module 150 includes a flexible circuit 152 having various circuit components 154 for controlling the wireless ear computer 100. The battery 104 is connected to the flexible circuit 152, such as to a battery circuit that provides power to other components from the battery 104. The speaker 106 is connected to the flexible circuit 152, such as to a speaker circuit that controls operation of the speaker 106. In an exemplary embodiment, the antenna 200 (FIG. 5) is connected to the control module 150. For example, the antenna 200 may be connected to a transceiver 156 of the circuit components 154. The antenna 200 may be connected to an RF front-end module 158 of the circuit components 154.

In an exemplary embodiment, the flexible circuit 152 includes a ground plane 160. The antenna 200 may be electrically connected to the ground plane 160. The electronic components 102 may be electrically connected to the ground plane 160. The circuit components 154 may be electrically connected to the ground plane 160. Electrically connecting the various components to the ground plane 160 may enhance the performance of the antenna 200, such as providing a common or ground for all of the electrically conductive components of the wireless ear computer 100.

In an exemplary embodiment, the flexible circuit 152 surrounds a component pocket 162. For example, the flexible circuit 152 may extend along the multiple sides of the component pocket 162 to connect the various components located at various positions within the casing 110. In an exemplary embodiment, the flexible circuit 152 includes various panels 164 defining distinct portions of the flexible circuit 152. The panels 164 may be electrically connected by traces, contacts, or other connecting structures 166. One or more of the panels 164 may be continuous with each other. In the illustrated embodiment, the flexible circuit 152 includes an inner portion 152*a*, an outer portion 152*b*, an upper portion 152*c*, a lower portion 152*d*, and a front portion 152*e*. The flexible circuit 152 may include greater or fewer portions in alternative embodiments, such as a rear portion (not shown). In an exemplary embodiment, the panels 164 and the connecting structures 166 are manufactured from a single substrate, such as a flexible printed circuit board having various circuits formed on the panels 164 and the connecting structures 166.

In an exemplary embodiment, various components are located within the component pocket 162. For example, the battery 104 may be located within the component pocket 162. The RF front-end module 158 and/or the transceiver 156 may be located within the component pocket 162. As such, the ground plane 160 of the flexible circuit 152 may surround the components of the wireless ear computer 100. In various embodiments, the flexible circuit 152 is fitted to the casing 110, such as to extend along the interior surface of the casing 110 to define as large of a component pocket 162 as practical. However, in other embodiments, other components may be located between the flexible circuit 152 and the inner surface of the casing 110.

Figure 6:
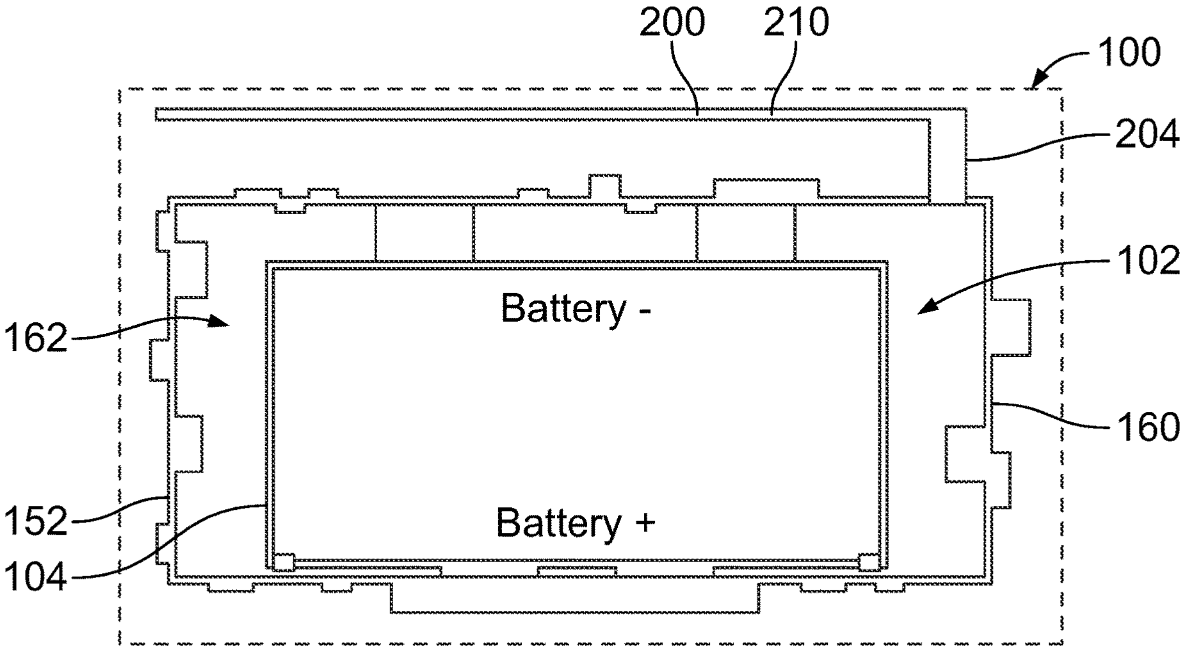
FIG. 6 is a schematic view of a side (for example, front side) of the wireless ear computer in accordance with an exemplary embodiment.
Figure 7:
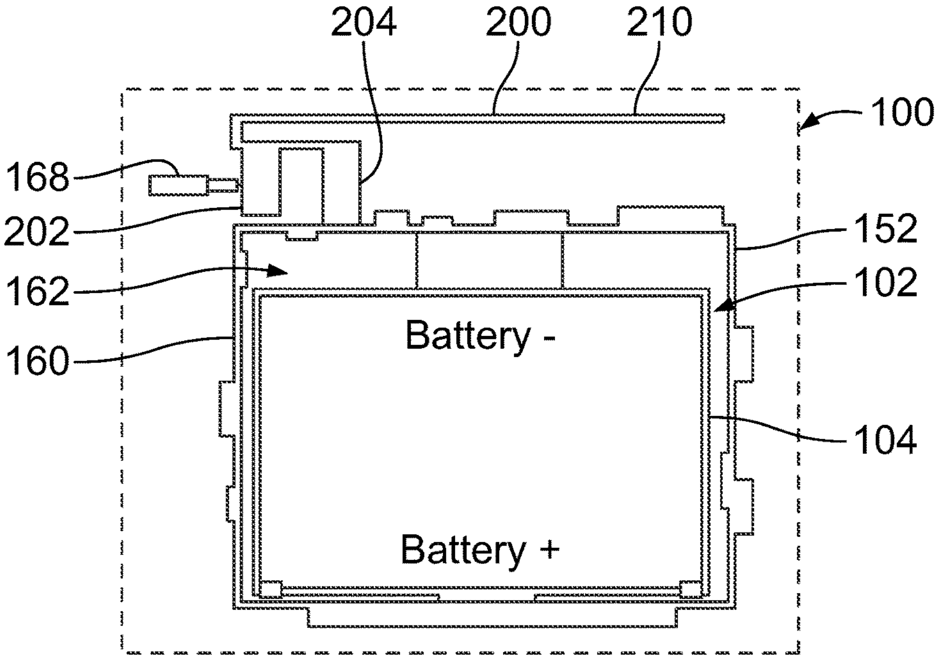
FIG. 7 is a schematic view of an end (for example, top end) of the wireless ear computer in accordance with an exemplary embodiment.

FIG. 6 is a schematic view of a side (for example, front side) of the wireless ear computer 100 in accordance with an exemplary embodiment. FIG. 7 is a schematic view of an end (for example, top end) of the wireless ear computer 100 in accordance with an exemplary embodiment. FIGS. 6 and 7 show the internal electronic components 102 and the antenna 200 in accordance with an exemplary embodiment.

The flexible circuit 152 surrounds the component pocket 162. The components are located within the component pocket 162. For example, the battery 104 is located within the component pocket 162. Terminals of the battery 104 may be electrically connected to the flexible circuit 152. Other components may additionally be located within the component pocket 162. The antenna 200 is connected to the flexible circuit 152. For example, the antenna 200 may be electrically connected to the ground plane of the flexible circuit 152.

In an exemplary embodiment, the antenna 200 includes an antenna feed 202 and an antenna ground 204 connected to an antenna element 210 configured to receive and/or transmit signals. In an exemplary embodiment, a transmission line 168 is connected to the antenna feed 202 of the antenna 200. In an exemplary embodiment, the antenna 200 is an inverted F antenna (IFA). The IFA includes a monopole antenna, defined by the antenna element 210, running parallel to the ground plane 160 and grounded at one end by the antenna ground 204. The ground plane 160 may be a layer of the flexible circuit 152, such as an outer layer or an inner layer. The antenna element 210 is fed by the antenna feed 202 at an intermediate point a distance from the antenna ground 204. The antenna 200 is short and compact allowing the antenna 200 to be contained within the casing 110 of the wireless ear computer 100. In an exemplary embodiment, the antenna 200 is positioned relative to the internal electronic components 102 and is patterned or shaped to provide impedance matching within the antenna circuit. The antenna 200 radiates efficiently without the need for extraneous matching components. The antenna 200 may be a planar inverted F antenna (PIFA), which may be printed in a microstrip format on the casing 110.

Figure 8:
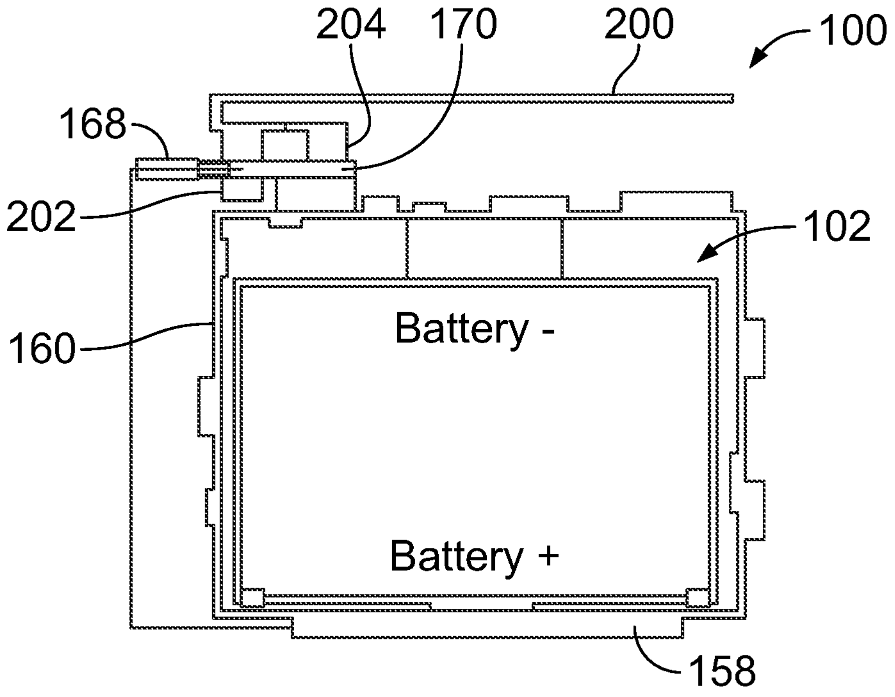
FIG. 8 is a schematic view of an end (for example, top end) of the wireless ear computer in accordance with an exemplary embodiment.
Figure 9:
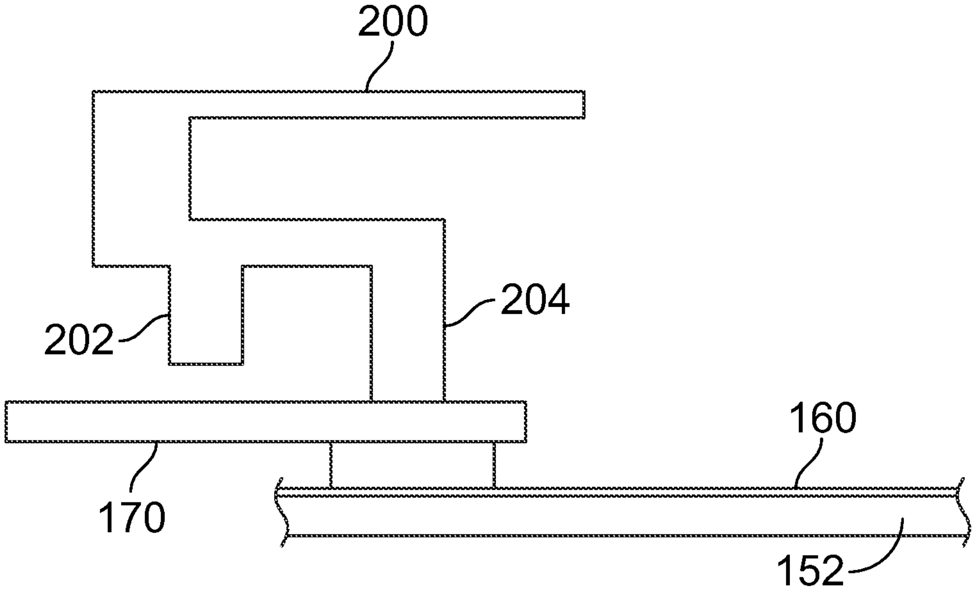
FIG. 9 is a schematic view of a portion of the wireless ear computer in accordance with an exemplary embodiment showing the connection of the antenna.

FIG. 8 is a schematic view of an end (for example, top end) of the wireless ear computer 100 in accordance with an exemplary embodiment. FIG. 9 is a schematic view of a portion of the wireless ear computer 100 in accordance with an exemplary embodiment showing the connection of the antenna 200. FIG. 8 shows the internal electronic components 102 and the antenna 200 in accordance with an exemplary embodiment.

In an exemplary embodiment, the transmission line 168 is connected between the antenna 200 and the RF front-end module 158. For example, the transmission line 168 may be a flexible circuit or a coaxial cable extending between the RF front-end module 158 and the antenna 200. The antenna feed 202 is connected to a transmission feed of the transmission line 168. The antenna ground 204 is connected to a transmission ground of the transmission line 168. For example, the transmission feed may be an inner conductor of the coaxial cable and the transmission ground may be an outer conductor of the coaxial cable. In other embodiments, the transmission feed may be a first trace or pad on the transmission flexible circuit and the transmission ground may be a second trace or pad on the transmission flexible circuit.

In an exemplary embodiment, a ground conductor 170 is provided between the antenna ground 204 and the ground plane 160. The ground conductor 170 may be a solder connection between the transmission ground and the ground plane 160 and/or the antenna ground 204. In other various embodiments, the ground conductor 170 may be a stamped and formed contact, such as a spring contact, between the transmission ground and the ground plane 160 and/or the antenna ground 204. In other various embodiments, the ground conductor 170 may be a conductive foam that is compressible between the transmission ground and the ground plane 160 and/or the antenna ground 204. In further embodiments, the ground conductor 170 may be a conductive tape between the transmission ground and the ground plane 160 and/or the antenna ground 204.

Figure 10:
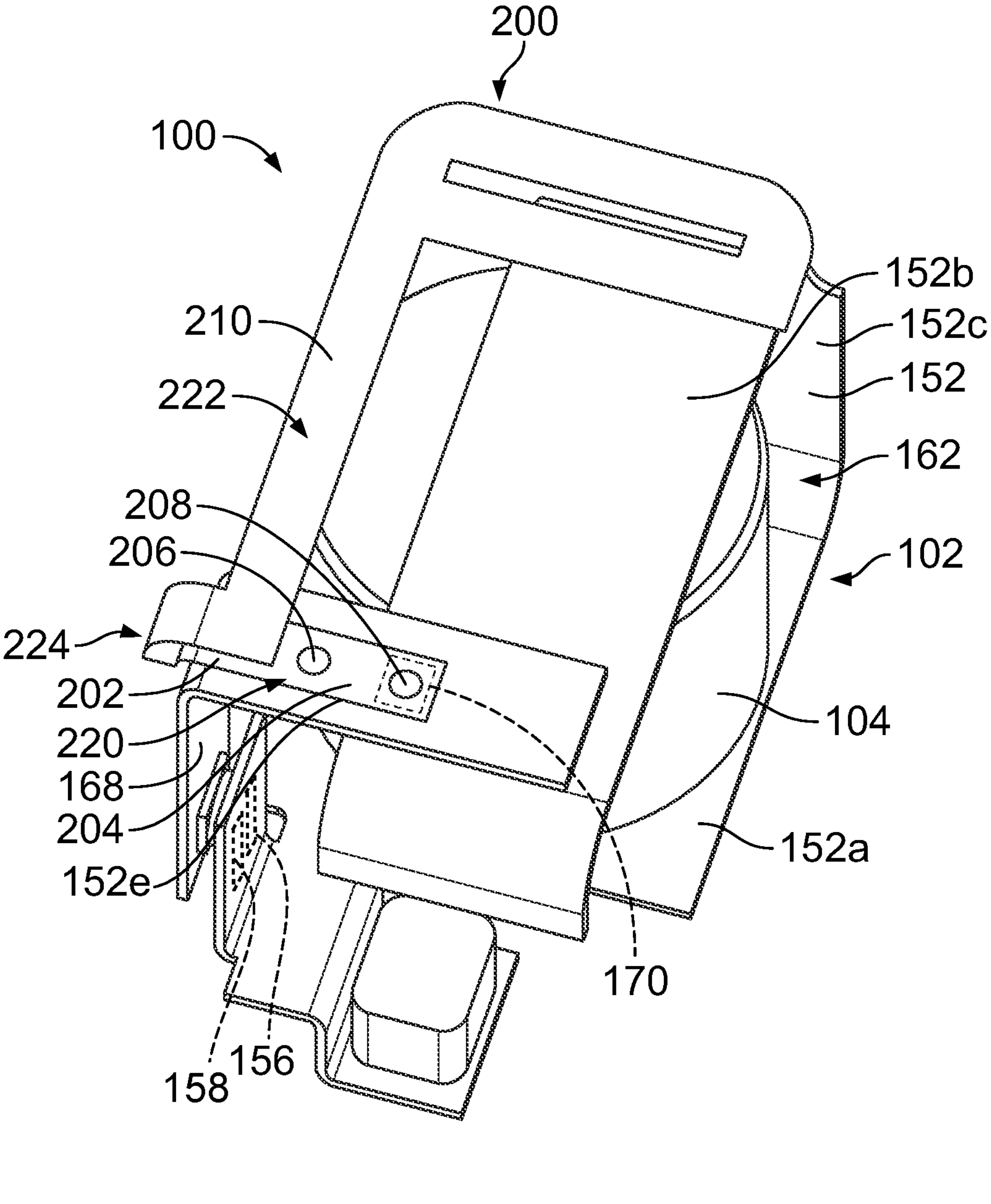
FIG. 10 is an end view of a portion of the wireless ear computer showing the internal electronic components and the antenna in accordance with an exemplary embodiment.
Figure 11:
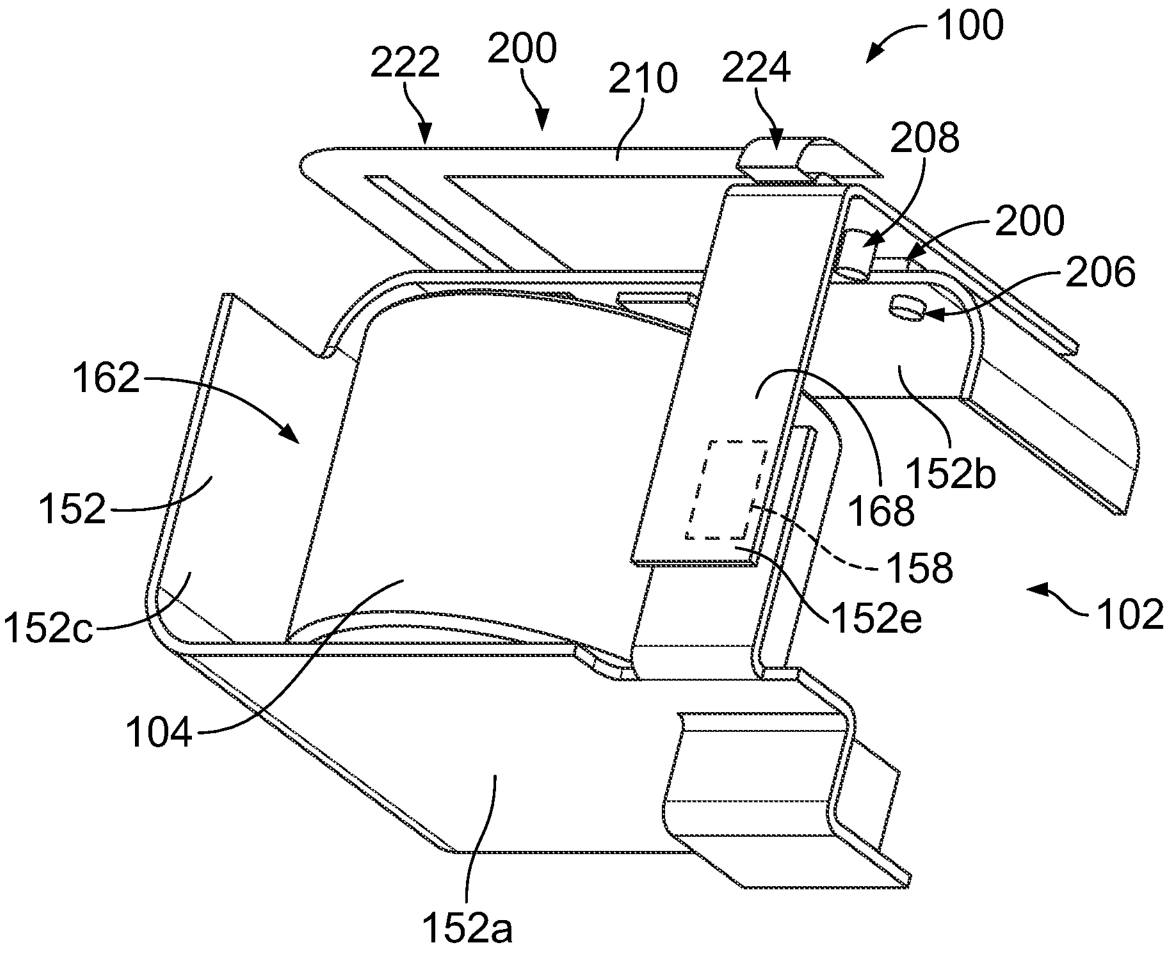
FIG. 11 is a front view of a portion of the wireless ear computer showing the internal electronic components in the antenna in accordance with an exemplary embodiment.

FIG. 10 is an outer end view of a portion of the wireless ear computer 100 showing the internal electronic components 102 and the antenna 200 in accordance with an exemplary embodiment. FIG. 11 is a front view of a portion of the wireless ear computer 100 showing the internal electronic components 102 in the antenna 200 in accordance with an exemplary embodiment. The casing 110 (FIG. 1) is removed to illustrate the antenna 200 relative to the internal electronic components 102.

The flexible circuit 152 surrounds the component pocket 162. The components are located within the component pocket 162. For example, the battery 104, the transceiver 156, and the RF front-end module 158 are located within the component pocket 162. For example, the battery 104 may be located between the inner portion 152*a* and the outer portion 152*b* of the flexible circuit 152. Terminals of the battery 104 may be electrically connected to the flexible circuit 152. The transceiver 156 may be located at the upper portion 152*c* of the flexible circuit 152. The RF front-end module 158 may be located at the inner portion 152*a* of the flexible circuit 152.

In an exemplary embodiment, the transmission line 168 is connected between the RF front-end module 158 and the antenna 200. In the illustrated embodiment, the transmission line 168 is part of the flexible circuit 152. However, the transmission line 168 may be a separate flexible circuit in alternative embodiments. In other various embodiments, the transmission line 168 may include a coaxial cable routed between the RF front-end module 158 and the antenna 200. The transmission line 168 may include a stamped and formed contact, such as a spring contact, between the RF front-end module 158 and the antenna 200 in other various embodiments. The transmission line 168 may include other types of contacts or conductors in alternative embodiments, such as a spring, conductive foam, conductive gasket, a conductive tape, a conductive polymer contact, wire contact, pin contact, or other type of conductor. In the illustrated embodiment, the transmission line 168 is provided at the front portion 152*e* of the flexible circuit 152. The transmission line 168 extends between the inner end and the outer end to connect the RF front-end module 158 and the antenna 200. Other locations are possible in alternative embodiments In an exemplary embodiment, the antenna 200 includes an antenna feed 202 and an antenna ground 204 connected to an antenna element 210 configured to receive and/or transmit signals. The antenna feed 202 is configured to be connected to the transmission line 168. For example, the antenna feed 202 includes a feed post 206 electrically connected to the transmission line 168. The antenna ground 204 is configured to be electrically connected to the ground plane 160 of the flexible circuit 152. For example, the antenna ground 204 includes a ground post 208 electrically connected to the ground plane 160.

In an exemplary embodiment, the antenna 200 includes an inner portion configured to be located within the cavity 112 of the casing 110, an outer portion 222 configured to be located outside of the casing 110, and a connecting portion 224 between the inner portion 220 and the outer portion 222. For example, the connecting portion 224 may extend through the casing 110 or around an edge surface of the casing 110 to connect the inner portion 220 and the outer portion 222. The inner portion 220 is located in close proximity to the flexible circuit 152 to electrically connect to the flexible circuit 152. For example, the antenna feed 202 and the antenna ground 204 may be provided along the inner portion 220. The outer portion 222 is located remote from the flexible circuit 152. The outer portion 222 is spaced apart from the ground plane 160 of the flexible circuit 152 to reduce interference and improve antenna signaling (for example, transmit and receive) of the antenna 200. In various embodiments, the inner portion 220 extends along an interior surface of the casing 110 and/or the cover 116 and the outer portion 222 extends along an exterior surface of the casing 110 and/or the cover 116.

In an exemplary embodiment, a ground conductor 170 is provided between the antenna ground 204 and the ground plane 160. The ground conductor 170 may be a solder connection between the ground post 208 and a pad or conductor on the flexible circuit 152 connected to the ground plane 160. In other various embodiments, the ground conductor 170 may be a stamped and formed contact, such as a spring contact, between the flexible circuit 152 and the ground post 208. In other various embodiments, the ground conductor 170 may be a conductive foam that is compressible between the ground post 208 and the flexible circuit 152. In further embodiments, the ground conductor 170 may be a conductive tape between the ground post 208 and the flexible circuit 152. In other various embodiments, the ground conductor 170 may be a cable shield or outer conductor of a coaxial conductor connected between the antenna ground 204 and the flexible circuit 152 or another component, such as the RF front-end module 158.

In an exemplary embodiment, the antenna 200 is an inverted F antenna (IFA). The IFA includes a monopole antenna, defined by the antenna element 210, running parallel to the ground plane 160 and grounded at one end by the antenna ground 204. The antenna element 210 is fed by the antenna feed 202 at an intermediate point a distance from the antenna ground 204. The antenna 200 is short and compact allowing the antenna 200 to be contained within the casing 110 of the wireless ear computer 100. In an exemplary embodiment, the antenna 200 is positioned relative to the internal electronic components 102 and is patterned or shaped to provide impedance matching within the antenna circuit. The antenna 200 radiates efficiently without the need for extraneous matching components. The antenna 200 may be a planar inverted-F antenna (PIFA), which may be printed in a microstrip format on the casing 110.

Figure 12:
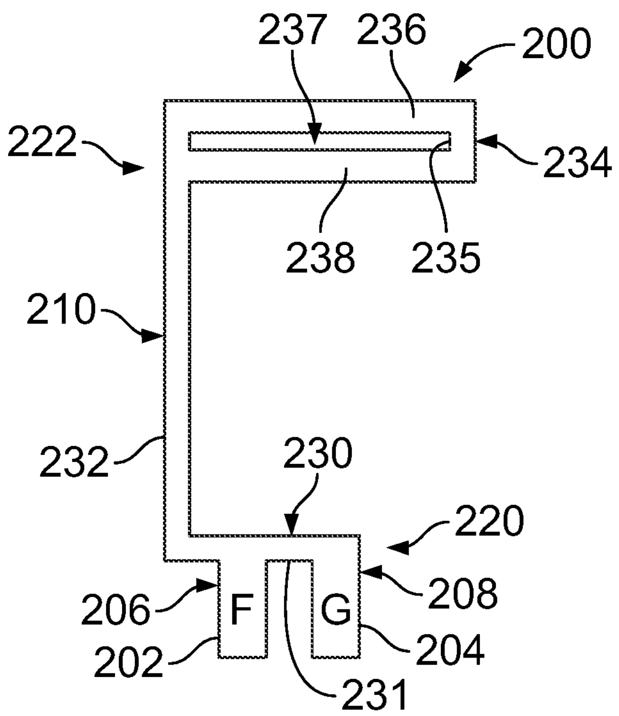
FIG. 12 is a schematic view of the antenna in accordance with an exemplary embodiment.

FIG. 12 is a schematic view of the antenna 200 in accordance with an exemplary embodiment. FIG. 12 shows the antenna feed 202, the antenna ground 204 and the antenna element 210 extending from the antenna feed 202 and the antenna ground 204. The antenna feed 202 and the antenna ground 204 are provided at the inner portion 220 of the antenna 200. Antenna element 210 is provided at the outer portion 222 of the antenna 200.

In an exemplary embodiment, the antenna 200 includes a feed line 230, a main line 232, and a branch line 234. The main line 232 extends between the feed line 230 and the branch line 234. The feed line 230 connects the antenna feed 202 and the antenna ground 204 to the main line 232. In an exemplary embodiment, the feed line 230 includes a connecting line 231 directly connecting the feed post 206 and the ground post 208. The connecting line 231 directly connects the feed post 206 and the ground post 208. In various embodiments, the main line 232 extends along one side of the antenna 200 (for example, along a front side) while the feed line 230 is provided at a bottom of the antenna 200 and the branch line 234 is provided at the top of the antenna. The main line 232 spaces the branch line 234 apart from the feed line 230. The branch line 234 extends between a front and a rear of the antenna 200. Other orientations are possible in alternative embodiments.

In an exemplary embodiment, the branch line 234 includes a first branch 236, a tail 235 extending from a distal end of the first branch 236, and a second branch 238. The tail 235 connects the first branch 236 and the second branch 238. In the illustrated embodiment, the first branch 236 is parallel to the second branch 238. A slot 237 is formed between the first and second branches 236, 238. The slot 237 has a width between the main line 232 and the tail 235. The widths and lengths of the branches 236, 238 control antenna characteristics of the antenna 200, such as operating frequencies of the antenna 200. The width and length of the slot 237 controls antenna characteristics of the antenna 200, such as operated frequencies of the antenna 200. The branch line 234 may include additional branches in alternative embodiments. The branches 236 and/or 238 may follow nonlinear paths in alternative embodiments, such as meandering paths.

Figure 13:
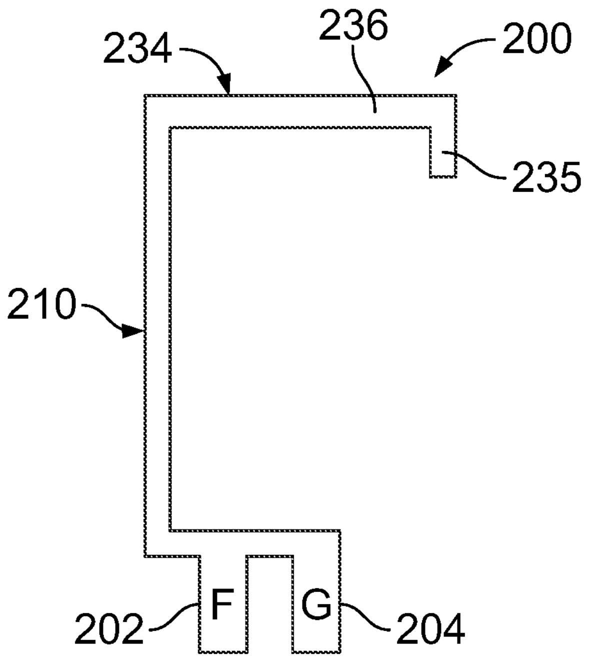
FIG. 13 is a schematic view of the antenna in accordance with an exemplary embodiment.

FIG. 13 is a schematic view of the antenna 200 in accordance with an exemplary embodiment. FIG. 13 shows the antenna feed 202, the antenna ground 204 and the antenna element 210 extending from the antenna feed 202 and the antenna ground 204. In the illustrated embodiment, the antenna 200 is similar to the antenna shown in FIG. 12; however, the antenna 200 is provided without the second branch 238 to provide different antenna characteristics. Rather, the branch line 234 includes the first branch 236 and the tail 235. The second branch 238 may be removed to position the antenna 200 further from another structure, such as one of the internal components of the wireless ear computer 100. For example, the second branch 238 may be removed to position the antenna 200 further from the ground plane.

Figure 14:
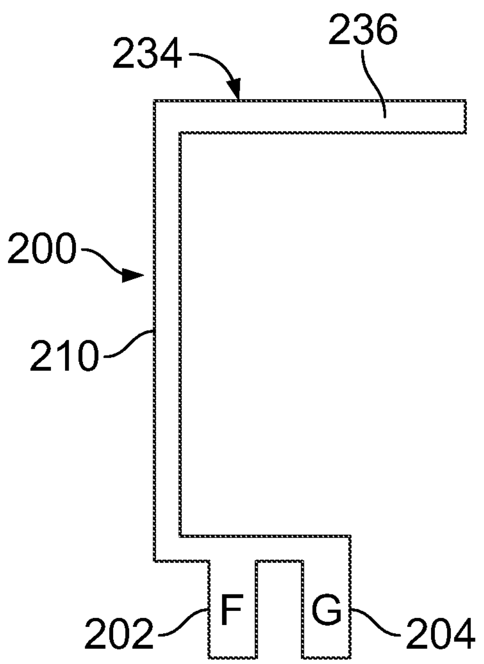
FIG. 14 is a schematic view of the antenna in accordance with an exemplary embodiment.

FIG. 14 is a schematic view of the antenna 200 in accordance with an exemplary embodiment. FIG. 14 shows the antenna feed 202, the antenna ground 204 and the antenna element 210 extending from the antenna feed 202 and the antenna ground 204. In the illustrated embodiment, the antenna 200 is similar to the antenna shown in FIG. 12; however, the antenna 200 is provided without the second branch 238 and without the tail 235 to provide different antenna characteristics. Rather, the branch line 234 includes the first branch 236.

Figure 15:
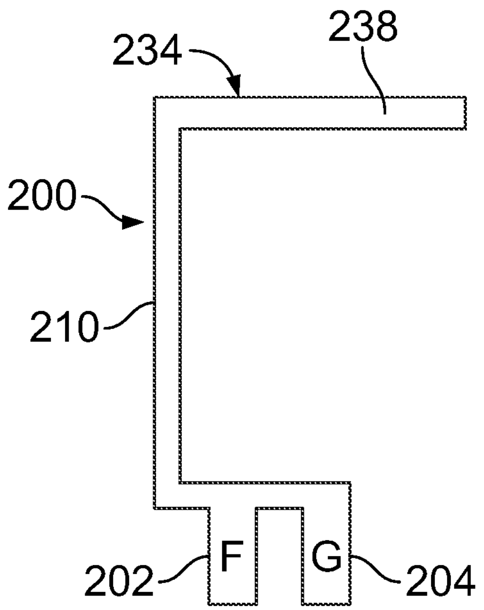
FIG. 15 is a schematic view of the antenna in accordance with an exemplary embodiment.

FIG. 15 is a schematic view of the antenna 200 in accordance with an exemplary embodiment. FIG. 15 shows the antenna feed 202, the antenna ground 204 and the antenna element 210 extending from the antenna feed 202 and the antenna ground 204. In the illustrated embodiment, the antenna 200 is similar to the antenna shown in FIG. 12; however, the antenna 200 is provided without the first branch 236 and without the tail 235 to provide different antenna characteristics. Rather, the branch line 234 includes the second branch 238. The first branch 236 may be removed to position the antenna 200 further from another structure, such as one of the internal components of the wireless ear computer 100. For example, the first branch 236 may be removed to position the antenna 200 further from the ground plane.

Figure 16:
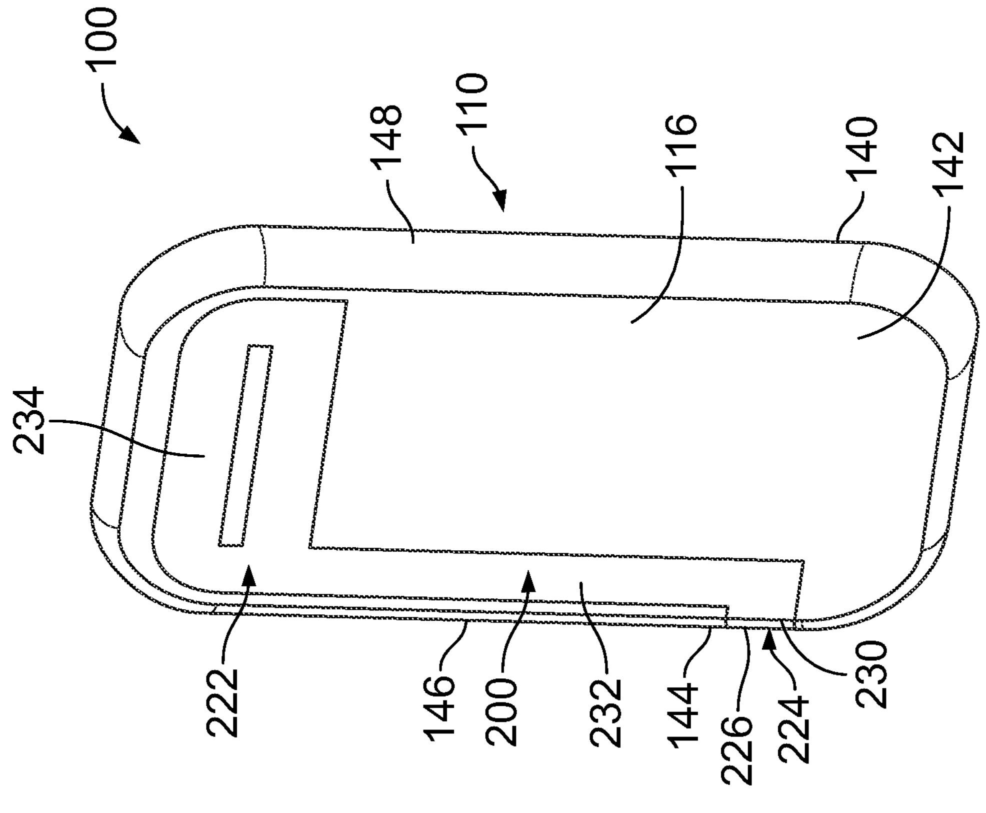
FIG. 16 is an outer view of a portion of the casing showing the antenna in accordance with an exemplary embodiment.
Figure 17:
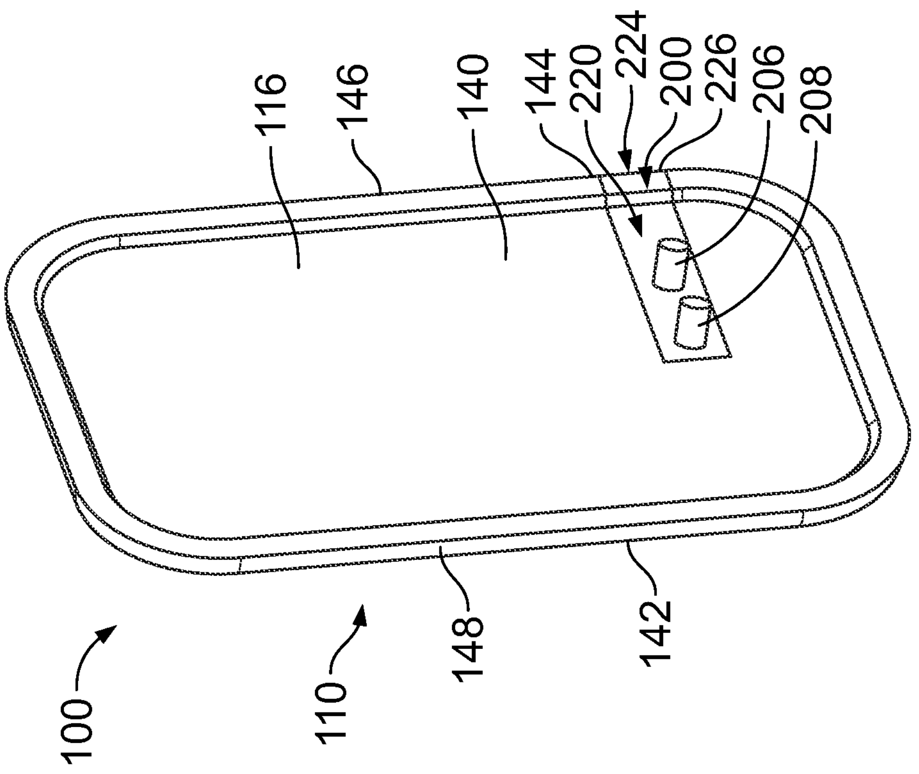
FIG. 17 is an inner view of a portion of the casing showing the antenna in accordance with an exemplary embodiment.

FIG. 16 is an outer view of a portion of the casing 110 showing the antenna 200 in accordance with an exemplary embodiment. FIG. 17 is an inner view of a portion of the casing 110 showing the antenna 200 in accordance with an exemplary embodiment. FIGS. 16 and 17 illustrate the cover 116 of the casing 110 showing the positioning of the antenna 200 on the cover 116.

In an exemplary embodiment, the antenna 200 is provided directly on surfaces of the cover 116. For example, the antenna 200 may be applied directly to the cover 116. In various embodiments, the antenna 200 is plated or coated on cover 116. The antenna 200 may be applied by a laser direct structuring (LDS) process in various embodiments. The antenna 200 may be a microstrip applied to the cover 116. In various embodiments, the antenna 200 or portions of the antenna 200 may be embedded within and/or pass through the cover 116.

The cover 116 includes an interior surface 140 (FIG. 17) and an exterior surface 142 (FIG. 16). The inner portion 220 of the antenna 200 is provided on the interior surface 140. The outer portion 222 of the antenna 200 is provided on the exterior surface 142. The connecting portion 224 connects the inner portion 220 and the outer portion 222. In an exemplary embodiment, the connecting portion 224 includes a side trace 226 connecting the inner portion 220 and the outer portion 222. For example, the connecting portion 224 extends along an edge 144 of the cover 116, which extends between the interior surface 140 and the exterior surface 142. The side trace 226 is routed along surfaces (inner/edge/outer) of the cover 116. In various embodiments, the connecting portion 224 may additionally, or alternatively, include a through trace (not shown) connecting the inner portion 220 and the outer portion 222. The through trace may extend internally through the cover 116. For example, the through trace may be a plated or filled via passing through the cover 116.

The feed line 230 of the antenna 200 extends along the interior surface 140 between the feed post 206 (FIG. 11) and the ground post 208 (FIG. 11). The feed post 206 and the ground post 208 may be defined by post like structures molded or formed into the cover 116. Alternatively, the feed post 206 and/or the ground post 208 may be defined by a contact or wire coupled to the feed line 230. In the illustrated embodiment, the feed line 230 is located proximate to the bottom of the cover 116. The main line 232 extends along the exterior surface 142, such as along a side 146 of the cover 116. The branch line 234 extends along the exterior surface 142 from the main line 232. The branch line 234 may extend from the side 146 two and opposite sides 148 of the cover 116. In an exemplary embodiment, a large portion of the cover 116 is devoid of the antenna structure. Rather, the pattern of the antenna 200 is designed to extend along certain areas of the cover 116 and avoid other areas of the cover 116, such as to avoid interference by the internal electronic components 102 within the interior of the wireless ear computer 100.

Figure 18:
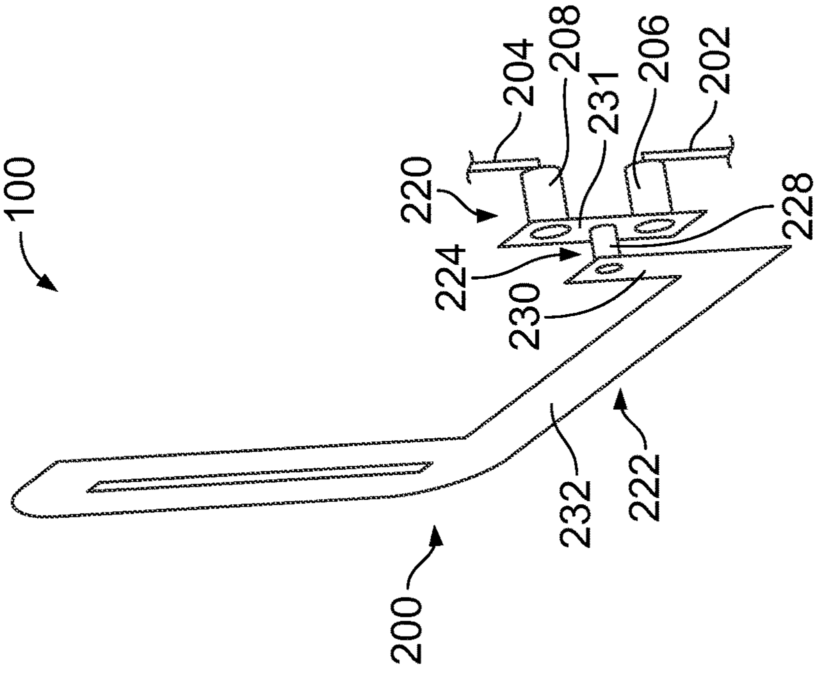
FIG. 18 is an enlarged view of a portion of the wireless ear computer showing the antenna in accordance with an exemplary embodiment.

FIG. 18 is an enlarged view of a portion of the wireless ear computer 100 showing the antenna 200 in accordance with an exemplary embodiment. The inner portion 220 of the antenna 200 extends into the interior of the casing 110 (shown in FIGS. 16 and 17) while the outer portion 222 of the antenna 200 extends along the exterior of the casing 110. The connecting portion 224 extends between the inner portion 220 and the outer portion 222.

The feed post 206 of the antenna feed 202 is connected to the transmission line 168. The ground post 208 of the antenna ground 204 is connected to the ground conductor 170. The connecting line 231 of the feed line 230 directly connects the ground post 208 and the feed post 206. A through trace 228 of the connecting portion 224 extends from the feed line 230 to the main line 232. As such, the main line 232 is connected to the antenna feed 202 and the antenna ground 204 by the feed line 230 and the through trace 228. The through trace 228 connects the inner portion 220 and the outer portion 222. The through trace 228 may extend internally through the cover 116. For example, the through trace 228 may be a plated or filled via passing through the cover 116. Optionally, the through trace 228 may be connected to the connecting line 231 approximately centered between the feed post 206 and the ground post 208. The location of the connection along the connecting line 231 may control the antenna characteristics of the antenna 200. For example, connecting closer to the feed post 206 versus closer to the ground post 208 may affect the operating frequency of the antenna 200. The feed post 206 at the antenna feed 202 may be connected to the ground post 208 of the antenna ground 204 by the connecting line 231. The connecting line 231 may be connected to the main line 232 by the through trace 228 of the connecting portion 224.

Figure 19:
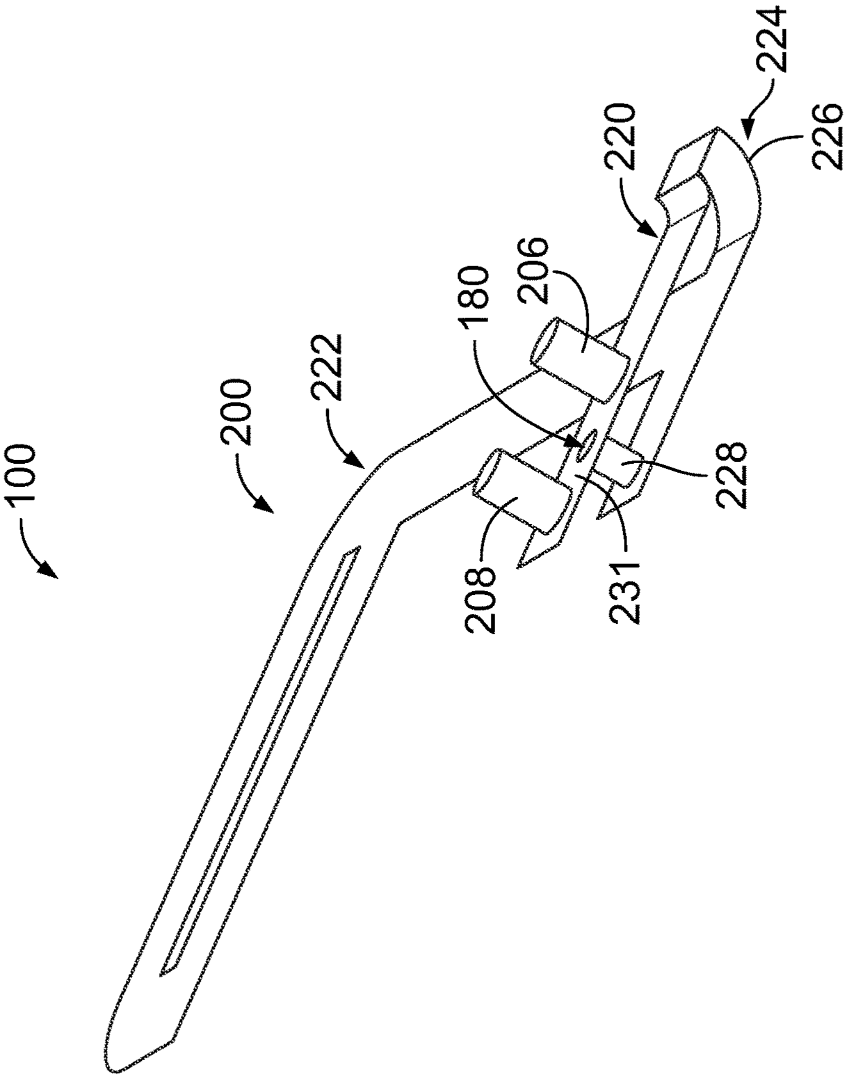
FIG. 19 is an enlarged view of a portion of the wireless ear computer showing the antenna in accordance with an exemplary embodiment.

FIG. 19 is an enlarged view of a portion of the wireless ear computer 100 showing the antenna 200 in accordance with an exemplary embodiment. The antenna 200 shown in FIG. 19 is similar to the antenna shown in FIG. 18; however, the connecting portion 224 includes the through trace 228 in addition to the side trace 226. The through trace 228 extends between the inner portion 220 and the outer portion 222 through an opening or via 180 of the casing. The through trace 228 is electrically connected to the connecting line 231 of the inner portion 220. Optionally, the through trace 228 may be connected to the connecting line 231 approximately centered between the feed post 206 and the ground post 208. The location of the connection along the connecting line 231 may control the antenna characteristics of the antenna 200.

For example, connecting closer to the feed post 206 versus closer to the ground post 208 may affect the operating frequency of the antenna 200. The feed post 206 at the antenna feed 202 may be connected to the outer portion 222 by the side trace 226 of the connecting portion 224. The ground post 208 of the ground feed 202 may be connected to the outer portion 222 by the through trace 228 of the connecting portion 224.

Figure 21:
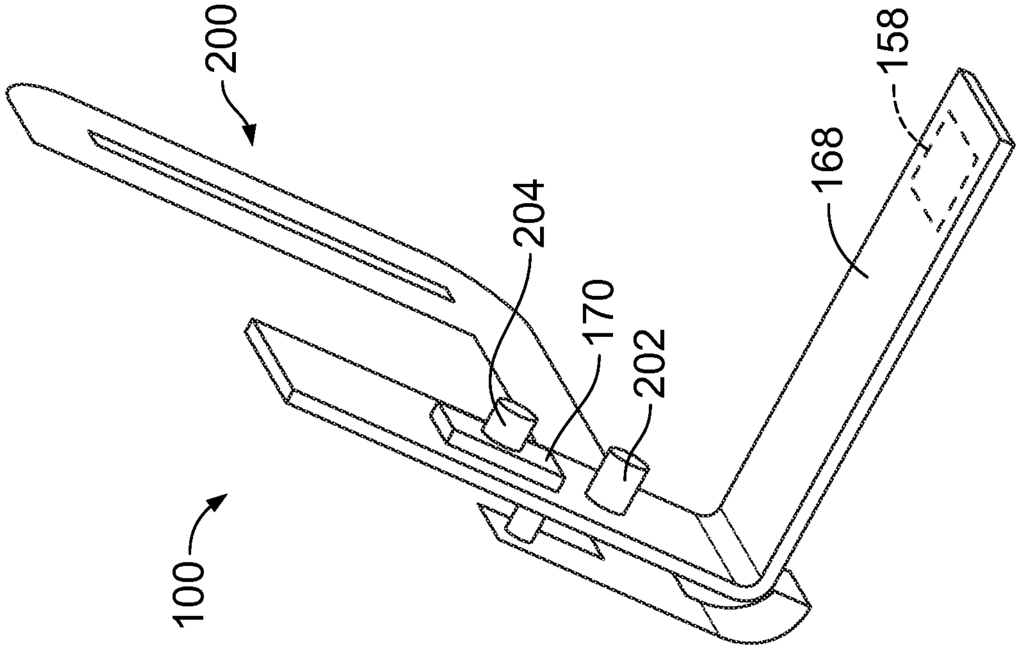
FIG. 21 is an inner end view of a portion of the wireless ear computer showing the antenna in accordance with an exemplary embodiment.
Figure 20:
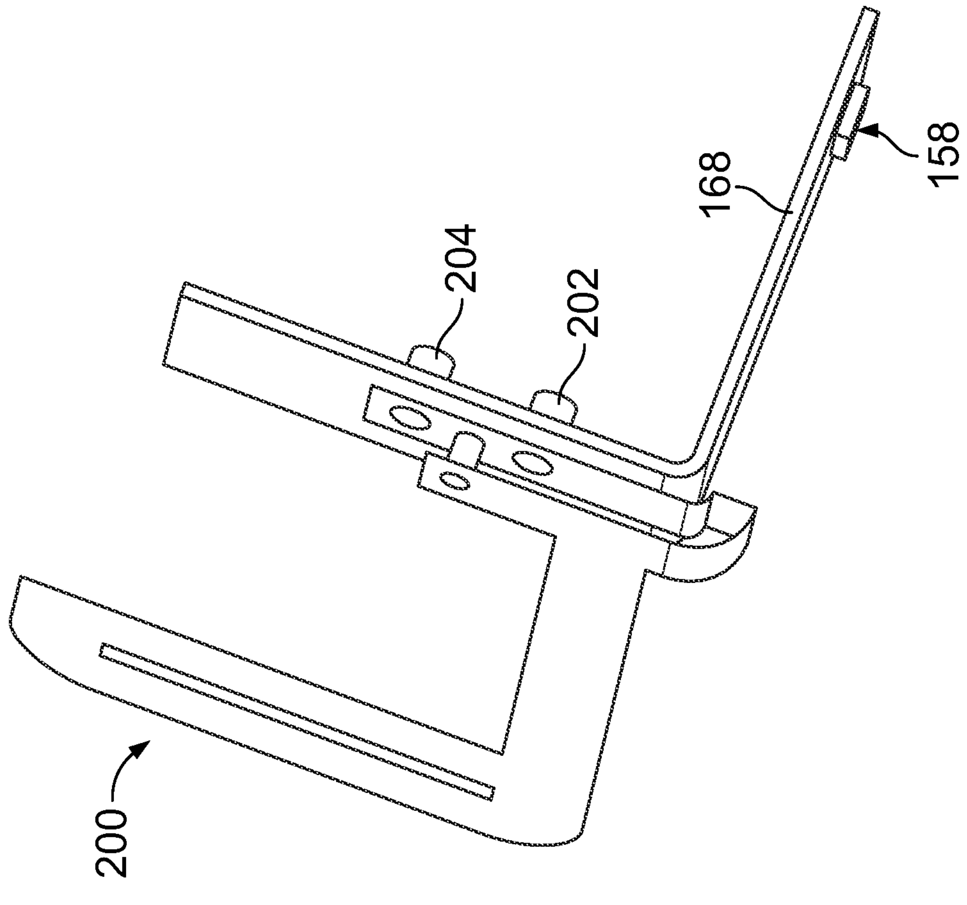
FIG. 20 is an outer end view of a portion of the wireless ear computer showing the antenna in accordance with an exemplary embodiment.

FIG. 20 is an outer end view of a portion of the wireless ear computer 100 showing the antenna 200 in accordance with an exemplary embodiment. FIG. 21 is an inner end view of a portion of the wireless ear computer 100 showing the antenna 200 in accordance with an exemplary embodiment. The antenna 200 is shown electrically connected to the transmission line 168. In the illustrated embodiment, the transmission line 168 is a flexible circuit. The transmission line 168 may be routed from one portion or area of the wireless ear computer 100 to the termination area of the antenna 200. In an exemplary embodiment, the transmission line 168 is electrically connected to the RF front-end module 158 and routed to the antenna termination area. The antenna feed 202 is electrically connected to a feed circuit of the transmission line 168. Optionally, the antenna ground 204 may be electrically connected to a ground circuit of the transmission line 168.

In various embodiments, the ground conductor 170 is provided between the transmission line 168 and the ground plane 160. The ground conductor 170 may be electrically connected to a ground circuit of the transmission line 168. The ground conductor 170 may be electrically connected to the RF front-end module 158 by the transmission line 168. In the illustrated embodiment, the ground conductor 170 is a stamped and formed contact, such as a spring contact, between the transmission line 168 and the ground plane 160 of the flexible circuit 152. The ground conductor 170 may additionally be electrically connected to the antenna ground 204 of the antenna 200. In alternative embodiments, the ground conductor 170 may be a flexible circuit. In other various embodiments, the ground conductor 170 may be a conductive foam or a conductive tape.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A wireless ear computer comprising:

a casing forming a cavity, the casing including an interior surface and an exterior surface;

a flexible circuit received in the cavity, the flexible circuit surrounding multiple sides of a component pocket configured to receive at least one electrical component, the flexible circuit having a power circuit, the flexible circuit including a ground plane;

a battery received in the component pocket and surrounded on multiple sides by the flexible circuit, the battery operably coupled to the power circuit to power the at least one electrical component, the battery connected to the ground plane of the flexible circuit;

an antenna separate and discrete from the casing and coupled to the casing, the antenna having an antenna element extending along the casing, the antenna element including an inner portion extending along the interior surface and an outer portion extending along the exterior surface, the antenna element including a connecting portion between the inner portion and the outer portion, the antenna element being spaced apart from, and located outward of, the flexible circuit, the antenna including an antenna feed and an antenna ground, the antenna ground being connected to the ground plane of the flexible circuit.

2. The wireless ear computer of claim 1, wherein the connecting portion includes a side trace wrapping around the side of the casing from the interior surface to the exterior surface.

3. The wireless ear computer of claim 1, wherein the connecting portion includes a through trace extending through the casing between the interior surface and the exterior surface.

4. The wireless ear computer of claim 1, wherein the antenna feed includes a feed post connected to the transmission line and the antenna ground includes a ground post connected to the ground plane of the flexible circuit, the connecting portion including a connecting line between the feed post and the ground post directly connecting the antenna feed and the ground feed.

5. The wireless ear computer of claim 4, wherein the connecting portion includes a through line connecting the connecting line and the outer portion of the antenna.

6. The wireless ear computer of claim 1, wherein the flexible circuit extends circumferentially around the component pocket.

7. The wireless ear computer of claim 1, wherein the antenna element includes a feed line, a branch line, and a main line between the feed line and the branch line, the feed line connecting the antenna feed and the antenna ground to the main line, the main line extending between a top and a bottom of the casing, the branch line extending from the main line between an outer end and an inner end of the casing.

8. The wireless ear computer of claim 7, wherein the branch line includes a first branch and a second branch spaced apart from the first branch and extending between the outer end and the inner end of the casing.

9. The wireless ear computer of claim 1, wherein the flexible circuit includes a transceiver, wherein an RF front-end module is operably coupled to the transceiver, the antenna feed of the antenna being connected to the RF front-end module.

10. The wireless ear computer of claim 9, wherein the antenna further comprises a transmission line between the RF front-end module and the antenna feed, the transmission line being one of a coaxial cable, a flexible circuit, or a spring contact.

11. The wireless ear computer of claim 9, wherein the antenna ground is connected to the RF front-end module.

12. The wireless ear computer of claim 9, wherein the antenna element is located at a first side of the casing, the RF front-end module being located at a different second side of the casing.

13. The wireless ear computer of claim 1, wherein the antenna includes a ground conductor between the antenna ground and the ground plane, the ground conductor being one of a solder connection, a spring contact, a conductive foam, or a conductive tape.

14. The wireless ear computer of claim 1, wherein the casing includes a main housing defining the cavity and a cover closing the cavity, the cover being coupled to the main housing.

15. A wireless ear computer comprising:

a casing forming a cavity, the casing including an interior surface and an exterior surface;

a flexible circuit received in the cavity, the flexible circuit surrounding multiple sides of a component pocket configured to receive at least one electrical component, the flexible circuit having a power circuit and a speaker circuit, the flexible circuit including a ground plane;

a battery received in the component pocket and surrounded on multiple sides by the flexible circuit, the battery operably coupled to the power circuit to power the at least one electrical component, the battery connected to the ground plane of the flexible circuit;

a speaker operably coupled to the speaker circuit to control the speaker, the speaker connected to the ground plane of the flexible circuit;

an antenna separate and discrete from the casing and extending along the casing, the antenna element being spaced apart from, and located outward of, the flexible circuit, the antenna including an inner portion extending along the interior surface of the casing, the antenna including an outer portion extending along the exterior surface of the casing, the antenna including a connecting portion between the inner portion and the outer portion, the inner portion of the antenna including an antenna feed connected to a transmission line, the inner portion of the antenna including an antenna ground connected to the ground plane of the flexible circuit.

16. The wireless ear computer of claim 15, wherein the connecting portion includes at least one of a side trace wrapping around the side of the casing from the interior surface to the exterior surface and a through trace extending through the casing between the interior surface and the exterior surface.

17. A wireless ear computer comprising:

a casing forming a cavity, the casing including an interior surface and an exterior surface;

a flexible circuit received in the cavity, the flexible circuit surrounding multiple sides of a component pocket configured to receive at least one electrical component, the flexible circuit having a power circuit, the flexible circuit including a transceiver, the flexible circuit including a ground plane;

a battery received in the component pocket and surrounded on multiple sides by the flexible circuit, the battery operably coupled to the power circuit to power the at least one electrical component, the battery connected to the ground plane of the flexible circuit;

an RF front-end module coupled to the flexible circuit, the RF front-end module operably coupled to the transceiver; and an antenna separate and discrete from the casing and coupled to the casing, the antenna having an antenna element extending along the casing, the antenna element including an inner portion extending along the interior surface and an outer portion extending along the exterior surface, the antenna element including a connecting portion between the inner portion and the outer portion, the antenna element being spaced apart from, and located outward of, the flexible circuit, the antenna including an antenna feed and an antenna ground, the antenna feed being connected to the RF front-end module, the antenna ground being connected to the ground plane of the flexible circuit.

18. The wireless ear computer of claim 17, wherein the antenna further comprises a transmission line between the RF front-end module and the antenna feed, the transmission line being one of a coaxial cable, a flexible circuit, or a spring contact.

19. The wireless ear computer of claim 17, wherein the antenna element is located at a first side of the casing, the RF front-end module being located at a different second side of the casing.

* * * * *